United States Patent [19]

Krieg et al.

[11] Patent Number: 4,459,272
[45] Date of Patent: Jul. 10, 1984

[54] DRY CARBONATION PROCESS

[75] Inventors: John P. Krieg, Morristown; Anthony E. Winston, East Brunswick, both of N.J.

[73] Assignee: Church & Dwight Co., Inc., Piscataway, N.J.

[21] Appl. No.: 487,114

[22] Filed: Apr. 26, 1983

Related U.S. Application Data

[63] Continuation of Ser. No. 321,753, Oct. 19, 1981, abandoned, which is a continuation of Ser. No. 226,144, Jan. 19, 1981, abandoned, which is a continuation of Ser. No. 52,799, Jun. 28, 1979, abandoned, which is a continuation of Ser. No. 813,654, Aug. 31, 1977, abandoned.

[51] Int. Cl.³ .......................... C01D 7/14; C01D 7/37; C01D 7/00; C22B 26/10
[52] U.S. Cl. .................................. 423/422; 423/425; 423/427; 423/209
[58] Field of Search ............... 423/209, 421, 422, 425, 423/426, 427, 195, 203, 205, 206 T; 23/297, 300, 302 T

[56] References Cited

U.S. PATENT DOCUMENTS

| | | | |
|---|---|---|---|
| 64,385 | 4/1867 | Pohrnoff | 423/422 |
| 265,367 | 10/1882 | Babbitt | 423/422 |
| 276,020 | 4/1883 | Gaskell, Jr. et al. | 423/422 |
| 276,990 | 5/1883 | Gaskell, Jr. et al. | 423/422 |
| 574,089 | 12/1896 | Hawliczek | 423/422 |
| 658,727 | 9/1900 | Naef | 423/427 |
| 1,583,661 | 5/1926 | Cocksedge | 423/425 |
| 1,583,662 | 5/1926 | Sundstrom et al. | 423/425 |
| 3,295,930 | 1/1967 | Swanson et al. | 423/426 |
| 3,309,171 | 3/1967 | Gancy | 423/426 |
| 3,485,578 | 12/1969 | Gould | 423/425 |
| 3,647,365 | 3/1972 | Saeman | 423/209 |
| 3,701,737 | 10/1972 | Goldstein | 423/425 |
| 4,115,525 | 9/1978 | Gancy et al. | 423/425 |
| 4,151,266 | 4/1979 | Robey et al. | 423/425 |
| 4,285,925 | 8/1981 | Poncha | 423/427 |

FOREIGN PATENT DOCUMENTS

| | | | |
|---|---|---|---|
| 2164733 | 7/1973 | Fed. Rep. of Germany | 423/426 |
| 49-10197 | 1/1974 | Japan | 423/422 |
| 56-149317 | 11/1981 | Japan | 423/421 |
| 776331 | 6/1957 | United Kingdom | 423/421 |

Primary Examiner—Gary P. Straub
Attorney, Agent, or Firm—Hubbell, Cohen, Stiefel & Gross

[57] ABSTRACT

A process for the dry carbonation of an ammonium or alkali metal carbonate containing material, or a mixture thereof, for conversion to the corresponding bicarbonate containing material comprising reacting in the solid phase an ammonium and/or alkali metal carbonate containing material with liquid water in a carbon dioxide rich atmosphere at a particle temperature of from about 125° F. to about 240° F. for a period of time sufficient to effect the desired conversion of the carbonate groups of said carbonate containing material to bicarbonate groups, the reaction temperature being controlled by the evaporation of liquid water at the reaction site and the removal of the resulting water vapor from the reactor atmosphere.

20 Claims, 2 Drawing Figures

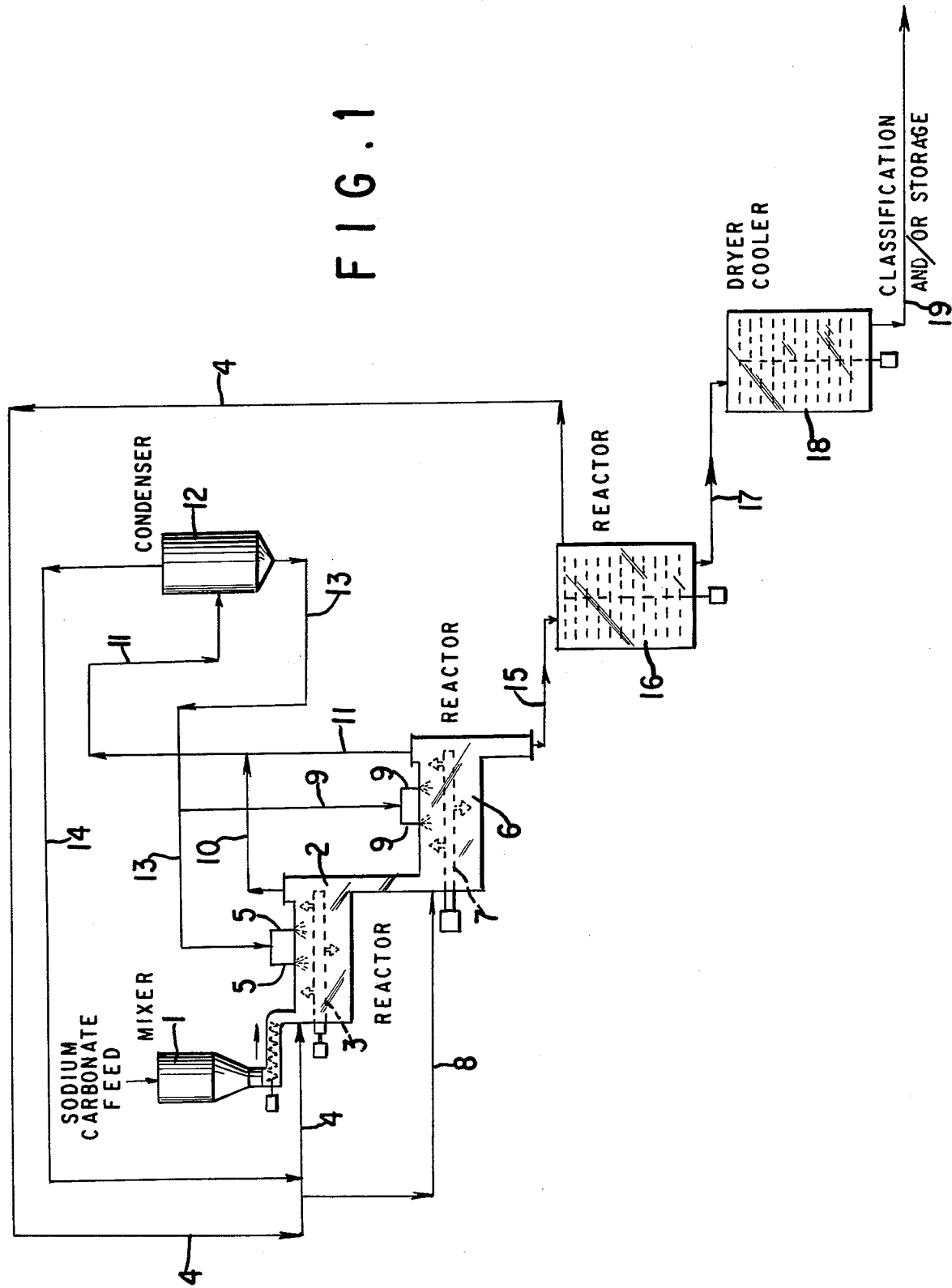

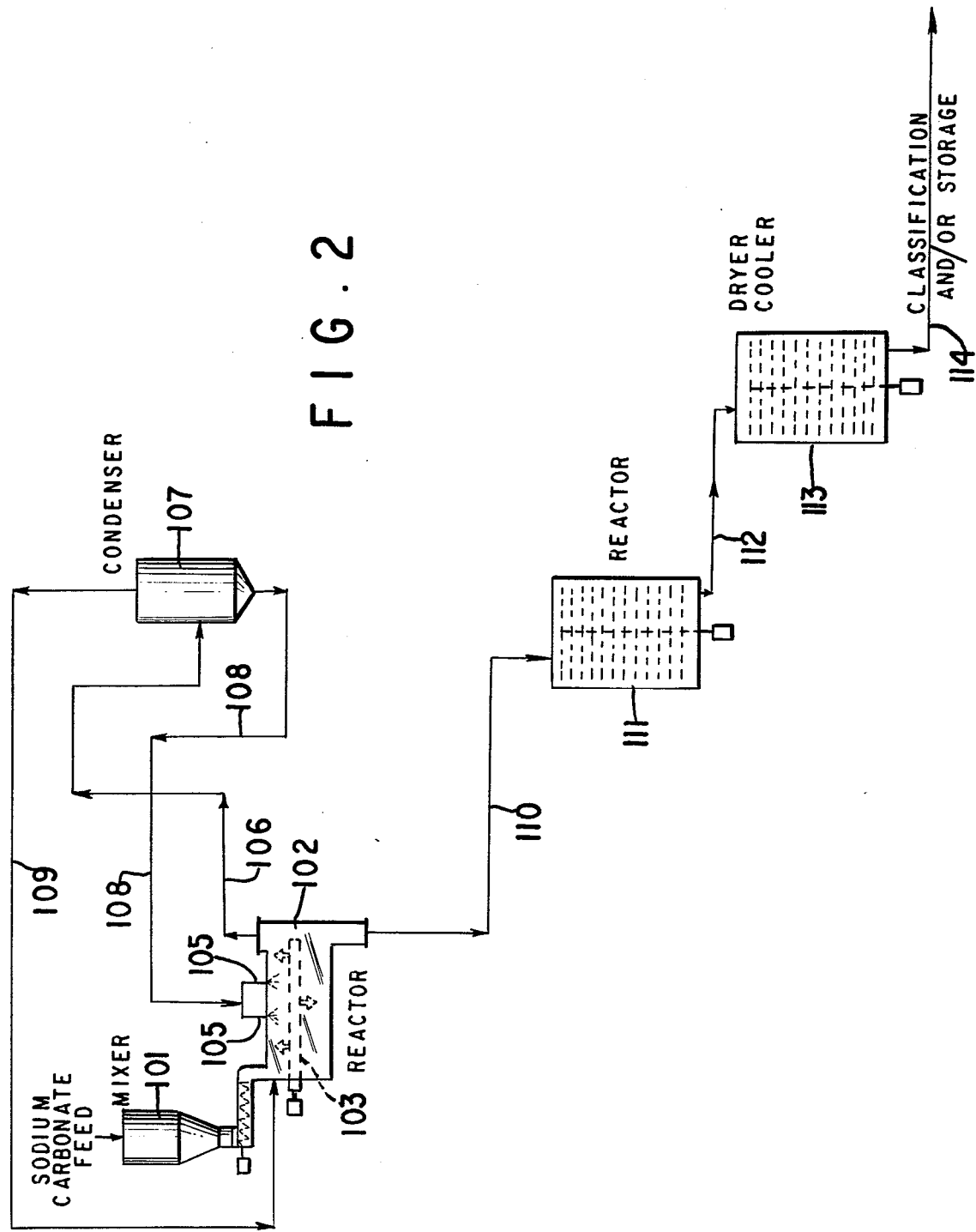

DRY CARBONATION PROCESS

PRIOR APPLICATIONS

This application is a continuation of copending application Ser. No. 321,753, filed Oct. 19, 1981, now abandoned, which application was a continuation of copending application Ser. No. 226,144, filed Jan. 19, 1981 and now abandoned; which application was a continuation of prior, co-pending application Ser. No. 52,799 filed June 28, 1979 and now abandoned; and which application was, in turn, a continuation of prior copending application Ser. No. 813,654 filed Aug. 31, 1977 and now abandoned.

STATE OF THE ART

The conventional process for the preparation of sodium bicarbonate is effected by carbonating a solution of sodium carbonate to precipitate crystals of sodium bicarbonate. This procedure requires prolonged reaction times and several steps as well as separation equipment and the handling of large volumes of liquids.

Both U.S. Pat. No. 276,990 and U.S. Pat. No. 574,089 disclose the carbonation of sodium carbonate monohydrate with carbon dioxide in the presence of steam, although U.S. Pat. No. 276,990 states that moisture can be added during the process by injecting a fine spray of water onto the salts. Neither process, however, discloses a method for controlling the reaction temperature, the heat of the exothermic carbonation reaction merely being dissipated through the reactor walls. In both patents reaction times are on the order of five to six hours.

U.S. Pat. No. 3,647,365 describes a two-step process for the formation of sodium bicarbonate, which process entails the formation of sodium carbonate hydrates and then the carbonation of such hydrates wherein the water necessary for the carbonation reaction is provided at the reaction site by the liberation of the water of hydration. This process must proceed slowly, with carbonation times exceeding one hour and drying times up to eight hours. The product produced by this process is of low density.

U.S. Pat. No. 3,701,737 describes a similar two-step process whereby wet sodium carbonate hydrate agglomerates are formed and then carbonated to produce sodium sesquicarbonate, and U.S. Pat. No. 4,115,525 teaches the heating of sodium sesquicarbonate in the presence of carbon dioxide and water vapor to produce Wegsheider's Salt.

OBJECTS OF THE INVENTION

It is an object of the invention to provide a novel process for the dry carbonation of particulate alkali metal and/or ammonium carbonate to form the corresponding alkali metal and/or ammonium bicarbonate while avoiding the problems of solution carbonation.

It is a further object of the invention to provide a process for the rapid production of bicarbonates with a commercially desirable high apparent density, which process is suitable with a wide range of starting materials.

It is a further object of the invention to provide novel bicarbonate-carbonate composite particles with variable ratios of bicarbonate to carbonate.

These and other objects and advantages of the invention will become obvious from the following detailed description.

THE INVENTION

The novel process of the invention for the preparation of particulate alkali metal and/or ammonium bicarbonate comprises reacting in the solid phase particulate alkali metal and/or ammonium carbonate containing material with from 2 to 50% added liquid water by weight of starting material in a carbon dioxide rich atmosphere at a particle temperature of 125° to 240° F. for a period of time sufficient to convert at least a portion of said carbonates to the corresponding bicarbonate. The reaction conditions are controlled so as to favor formation of bicarbonate directly rather than formation of carbonate hydrates.

The particulate carbonate starting material may be any alkali metal and/or ammonium carbonate containing material such as anhydrous sodium carbonate or soda ash, potassium carbonate, ammonium carbonate, sodium carbonate monohydrate, sodium sesquicarbonate, Wegscheider's Salt, calcined Trona or mixtures thereof, etc. The materials used can be pure or technical grades, or mixtures of carbonates with non-carbonatable materials such as sodium chloride.

The addition of liquid water is made in a carbon dioxide rich atmosphere rather than in a preliminary step so as to favor the carbonation reaction to form the bicarbonate, and to thereby effectively suppress the formation of stable carbonate hydrates. The amount of liquid water added is relatively small and preferably a plurality of spray nozzles or other means are used to ensure uniform addition of water to the carbonate particles.

The amount of liquid water to be added varies with the particular carbonate containing starting material used as well as the degree of carbonation or proportion of carbonate to be converted to bicarbonate. Thus, for example, to completely convert anhydrous sodium carbonate to sodium bicarbonate, from about 20% to about 50% liquid water by weight of sodium carbonate should be added. However, to convert one-half of the anhydrous sodium carbonate starting material to sodium bicarbonate, only from about 10% to about 25% liquid water by weight of starting material should be added. To completely convert sodium carbonate monohydrate to sodium bicarbonate, from about 7% to about 30% liquid water by weight of sodium carbonate monohydrate should be added, and to completely convert sodium sesquicarbonate to sodium bicarbonate, from about 2% to about 4% liquid water by weight of sodium sesquicarbonate should be added. Water in excess of the amount necessary for the carbonation reaction will remain in the reactor apparatus and some will be eliminated in the formation of carbonate monohydrate from unreacted carbonate. All quantities of water specified herein are given on the basis that the water vapor in the reactor atmosphere will be continuously condensed and recycled to the reaction mass in accordance with a preferred embodiment of the invention more fully described hereinafter. If such water vapor is not recycled, an additional quantity of liquid water equivalent to the amount of water vapor removed should be added to the reactor.

The addition of the water is preferably made continuously over a substantial portion of the total reaction time such as 15 to 25 minutes with a total reaction time of 40 minutes. The exact water addition period will be determined by the characteristics of the sodium carbonate feed particles in order to prevent agglomeration and caking of the particles and to moderate the rate of heat released by the carbonation reaction as well as to ensure complete and uniform liquid-solid contact.

The water added to the reaction may be pure or tap water or may be aqueous solutions of sodium carbonate, sodium bicarbonate or sodium hydroxide. Also useful is recycled water such as from the condensation of water vapor from the reactor vapor and water used to wash caked material from the reactor during the cleaning cycle.

The carbonation reaction proceeds by the following reaction:

$$Na_2CO_3 + CO_2 + H_2O \rightarrow 2NaHCO_3 + heat.$$

The reaction is highly exothermic and requires special measures for heat removal to prevent the temperature of the particulate mass from rising too high since at high temperatures sodium bicarbonate thermally decomposes to form sodium carbonate. The method of the present invention is to control the temperature by providing conditions whereby heat is removed from the reaction site by the evaporation of liquid water. Adding liquid water rather than steam and maintaining a reduced partial pressure of water vapor in the reactor atmosphere allows the water not used as a reactant to evaporate at the reaction site, and such evaporation effectively removes the heat of reaction from the particles. The removal of water vapor from the reactor atmosphere also allows one to maintain a sufficiently high partial pressure of carbon dioxide in the reactor atmosphere to maximize the rate of reaction. In this manner the added liquid water is effectively used as a heat pump to remove the heat of reaction from the particles and transfer such heat beyond the reactor vessel itself.

In a preferred embodiment of the invention, liquid water is added and a portion of the reactor atmosphere is continuously removed from the reactor and cooled to condense the water therein. The relatively dry atmosphere and the condensed water are then returned to the reactor. Control of the rate of vapor removal and recycle and the temperature of the recycled atmosphere permits control of the reaction temperature.

Control of the temperature and pressure is effected in order to favor the carbonation reaction rather than the formation of stable sodium carbonate hydrates. The temperature of the particulate mass, as distinguished from reaction zone temperature, is 125° to 240° F., preferably 160° to 200° F., at pressures from atmospheric pressure up to 10 atmospheres, preferably 1 to 3 atmospheres, and the residence time may vary from 5 to 60 minutes, depending on the degree of carbonation desired, the starting material used and the reaction conditions. For complete carbonation, 30 to 40 minutes is preferable.

The particulate mass should be thoroughly mixed to ensure uniform and efficient contacting of the water and solids with carbon dioxide, and any suitable mixer may be used either in a batch or continuous process. A portion of the carbonated product may be recycled to the feed stream to prevent agglomeration or caking of the particles and to achieve more complete carbonation. Also, the walls of the reactor are heated to prevent caking of the particles therein and a wall temperature of 150° to 260° F., preferably 212° to 240° F. has been found useful. This is in contrast to prior normal procedures wherein the walls of the reactor vessel are cooled to control the reaction temperature.

The atmosphere in the reactor zone is preferably carbon dioxide and water vapor, however, some inert gases may be present. The partial pressure of carbon dioxide in the reaction zone may range from 0.2 to 0.9, preferably 0.4 to 0.7 atmospheres, at a total pressure of 1 atmosphere. With a total pressure greater than 1 atmosphere, proportionately higher carbon dioxide partial pressures are employed with the balance being water vapor and inert gases. In a preferred embodiment of the invention, a small portion of the carbon dioxide use, either from the atmosphere recycle or "fresh", is introduced into the reactor via the water spray nozzles to atomize the liquid water being added.

The process of the invention is superior to the two-step prior art process of hydration and carbonation in that reaction times are shorter, the degree of carbonation is greater and a superior product results. For example, U.S. Pat. No. 3,647,365 forms sodium bicarbonate in the form of hollow beads with an apparent bulk density of 20 to 45 lbs./cu. ft. which is fragile resulting in more fines during handling, while the particles of the present process are solids with an apparent bulk density as high as 50 to 60 lbs./cu. ft. Such a high density sodium bicarbonate is presently in greater demand than a low density sodium bicarbonate, primarily because shipping costs are volume rather than weight dependant. Moreover, the present process can handle a variety of starting materials with only minor variation in process parameters, and the particle size of such starting material may range from fine (−100 mesh) up to coarse.

The process of the invention has many advantages over the prior art solution carbonation process as it avoids the steps and equipment necessary to separate the sodium bicarbonate particles from the mother liquor solution. Moreover, the present process requires only about 10 to 20% of the amount of water required by the solution process and avoids the handling of the recycle stream of solution. In the present process, the solution of the sodium carbonate and crystallization of sodium bicarbonate takes place within each individual particle rather than in the dilute (10 to 20% solids by weight) solution of sodium carbonate and the reaction time of the present process is on the order of 20 to 45 minutes versus one to two hours in the solution process.

The process of the invention is particularly useful for the partial carbonation of soda ash or sodium carbonate particles to produce a discrete sodium bicarbonate-sodium carbonate composite particle which has more desirable properties than a simple mixture of sodium bicarbonate and sodium carbonate in the same proportions. The composite materials of the invention have a coarser particle size distribution, are more free-flowing and readily handled and exhibit less tendency for fines settling as well as having satisfactory absorption of surface active agents when used as detergent builders.

To effect such a partial carbonation of the starting material to produce bicarbonate-carbonate composite particles, as opposed to complete conversion to produce substantially bicarbonate particles only, the amount of added water can be reduced, as the quantity of water added is proportional to the amount of bicarbonate in the final product particles. In the alternative, the carbon dioxide rich reactor atmosphere can be replaced with a substantially carbon dioxide free atmosphere at any time during carbonation to produce a partially carbonated product. With this method, most of the excess water can be absorbed as a hydrate obviating the need to dry the product.

The process is also useful for carbonation of sodium carbonate builders during detergent manufacture wherein the sodium carbonate containing detergent compositions are carbonated by the process of the invention and the surfactants such as alkyl aryl sulfonates are absorbed by the carbonate-bicarbonate composite material which results in better characteristics.

The novel dry carbonation apparatus of the invention is comprised of a reaction zone, means for introducing sodium carbonate particulate material into the reaction zone, means for introducing gaseous carbon dioxide into the reaction zone, means for uniformly adding water to the reaction zone, means for removing the atmosphere from the reaction zone to control the rate of reaction and the temperature and means for removing the carbonated product from the reaction zone.

The reactor is preferably an internally agitated, solids handling vessel or an externally driven rotating or vibrating drum whereby the reaction may be carried out batch wise or continously. The walls of the reaction zone are jacketed to heat the interior surfaces of the reactor to prevent or reduce caking of the products on the walls. The use of steam or hot water in the jacket to maintain the wall temperature at 150° to 240° F. has been found effective for this purpose. The reaction zone can also be adapted for operating at pressures above atmospheric pressure.

The reaction zone may be a one stage zone or a plurality of zones whereby the carbonation is effected in a plurality of stages and there may be a final stage where no water is introduced but carbonation is continued or completed. Various mixers of the desired type are available commercially which will ensure good mixing of the sodium carbonate feed material, water and carbon dioxide and which can be modified for use with the invention.

One of the critical features of the apparatus is a pump means to remove the atmosphere from the reaction zone in order to control the particle temperature within the desired temperature range of 125° to 240° F. at one atmosphere. The gas removed from the reaction zone via the pump means is preferably passed through a condenser to remove water by condensation and the gas is then recycled back to the reaction zone. The condensed water is also preferably returned to the reaction zone by a spray nozzle.

Referring now to the drawings:

FIG. 1 is a schematic flow diagram of an embodiment of the apparatus of the invention using continuous back mixed and plug-flow reactors.

FIG. 2 is another schematic flow diagram of a second embodiment of the apparatus of the invention operated at a pressure of 2 to 3 atmospheres.

Referring now to FIG. 1, the sodium carbonate containing feed material is added to a mixer-feeder 1 which feeds the material into the first reactor 2, preferably provided with a mixing means 3. Carbon dioxide is introduced into reactor 2 by line 4 and water is introduced therein by a plurality of nozzles 5. The reactor 2 is directly connected to a second reactor 6 provided with a mixing means 7 and means 8 for introducing carbon dioxide and means 9 for spraying water therein. Both reactors are provided with outlet means 10 and 11, respectively, for removing some of the vapors from the reactors and the vapors so removed are passed through condensor 12 wherein the water in the gas are condensed and recycled by line 13 to reactor 1. The carbon dioxide from condenser 12 is then preferably recycled by line 14 via line 4 to reactor 1.

The material in reactor 6 is then passed by line 15 to a reactor 16 with the carbon dioxide atmosphere to continue the reaction without water addition and to complete the carbonation. Carbon dioxide is recycled to the first reactor 2 from reactor 16 through line 4. The carbonated material is then passed by line 17 to dryer cooler 18 after which the sodium bicarbonate is removed by line 19, for classification and/or storage.

In the alternative arrangement of FIG. 2, the apparatus set up is substantially the same except that there is used only one mixer-reactor which is operated under pressure. Sodium carbonate containing particulate feed is added to mixer-feeder 101 and is then fed to reactor 102. The reactor 102 is equipped with a mixing means 103, means 104 for introducing carbon dioxide under pressure and means 105 for introducing uniformly the aqueous feed.

The vapors are removed from the reactor by line 106 to condensor 107 wherein water is condensed from the gas and recycled to reactor 102 by line 108 and the carbon dioxide gases are recycled by line 109 to reactor 102. The partially carbonated product, together with some of the carbon dioxide rich atmosphere, is passed from reactor 102 by line 110 to reactor 111 wherein carbonation is continued without further water addition. The carbonated product is then passed by line 112 to cooler-dryer 113 and then by line 114 to storage and/or classification.

In the following examples are described several preferred embodiments to illustrate the invention. However, it is to be understood that the invention is not intended to be limited to the specific embodiments.

EXAMPLE 1

Using the apparatus of FIG. 1, soda ash was introduced into the first reactor at a rate of 5,321 pounds per hour at 75° F. The average residence time of the soda ash in the reactor is 15 minutes, and the product is passed from the first reactor to the second reactor at a rate of 8,031 pounds per hour with additional carbon dioxide and water feed. About 50% of the soda ash fed to the first reactor has been converted to sodium bicarbonate and after a reaction time of about 15 minutes, the product totalling 8,926 pounds per hour is passed with some of the atmosphere to the third reactor. The product leaving the second reactor is about 80% converted to sodium bicarbonate. The product is then passed after about 10 minutes residence time to a dryer-cooler and the soda ash at this point has been substantially completely converted to sodium bicarbonate. Analysis of the product issuing from the cooler dryer at a rate of 8,418 pounds per hour showed 99.2% of sodium bicarbonate, 0.6% of sodium carbonate and the balance inert ingredients.

EXAMPLE 2

Using the apparatus of FIG. 2, soda ash was fed to the reactor 102 at a rate of 5,321 pounds per hour at a temperature of 175° F. 2,243 pounds per hour of carbon dioxide at a pressure of 30 psi, and 1,422 pounds per hour of water were also introduced and the residence time in the reactor was 30 minutes. The product leaving the reactor 102 was more than 60% converted to sodium bicarbonate and was then passed with some of the atmosphere to reactor 111 without water addition and after a residence time of 30 minutes, the product was passed to dryer-cooler 113 and was substantially completely carbonated. The product was discharged from cooler 113 at a rate of 8,418 pounds per hour and analysis thereof showed 99.2% sodium bicarbonate and 0.6% sodium carbonate.

EXAMPLE 3

Dense soda ash with a dry bulk density of 930 g/l was used as the starting material and it was carbonated for 30 minutes on a batch basis in a reactor with a jacket temperature of 150° F. Carbon dioxide was added to the reactor as needed. In three separate experiments, liquid water was added to the reactor at 8.5%, 16% and 30% by weight of the starting material. Vapor was removed from the reactor and water condensed therefrom and recycled to the reactor. The results are reported in the following Table.

TABLE

| | | | |
|---|---|---|---|
| Water Added, % by wt. starting material | 8.5 | 16 | 30 |
| Bulk Density Dry Product, g/l | 1100 | 1140 | 930 |
| Wt. % Bicarbonate (Water free basis) | 15 | 40 | 80+ |
| % Residual Water | 6 | 8 | 10 |

The results in the Table show that a high degree of carbonation was obtained in a short period of time when sufficient liquid water was added. The products were relatively free of lumps, were free flowing, and had a commercially desirable high bulk density.

EXAMPLE 4

Using a batch reactor, three runs were made with sodium carbonate monohydrate by adding 7.3, 11 and 29% liquid water by weight of starting material with removal of carbon dioxide rich vapor, water condensation and recycle of vapor and condensed water. High carbonation rates were noted with 95% conversion being obtained in less than 15 minutes. Two runs were made with sodium sesquicarbonate by adding 2 and 4% liquid water by weight of starting material in the same manner. These latter runs were somewhat faster, with 98% conversion being obtained in less than 10 minutes. In all cases no lumping or caking on the walls was observed.

EXAMPLE 5

105 pounds of dense, granular 99-100% pure potassium carbonate were charged to an internally agitated, intensive mixer-reactor heated to the vicinity of 150° F. Following purging of the system, carbon dioxide gas was introduced along with 7.3% liquid water by weight of starting material from a spray nozzle. The carbonation reaction proceeded similar to those employing sodium carbonate in Example 1. After 25 minutes, the reaction was stopped and the free flowing, granular product analyzed as 90% potassium bicarbonate.

Various modifications of the process and the apparatus of the invention may be made without departing from the spirit or scope thereof and it should be understood that the invention is intended to be limited only as defined in the appended claims.

We claim:

1. In a process for carbonating a water-soluble alkali metal or ammonium carbonate material free of water of hydration in the solid phase to convert at least 15% by weight of the carbonate material to the corresponding alkali metal or ammonium bicarbonate, the improvement comprising reacting the carbonate material in solid, particulate form with liquid water in a carbon dioxide-containing atmosphere under a total pressure of from 1 to 10 atmospheres to form a solution of the carbonate reactant within each individual particle and to crystallize the bicarbonate product formed therein, and carrying out the reaction by contacting the solid carbonate material, the liquid water and the gaseous carbon dioxide for from 5 to 60 minutes, the longer the reaction time, the higher degree of conversion, while maintaining the temperature of the particulate reactant within the range of from 125° to 240° F., by:

(a) adding both relatively dry carbon dioxide gas and a liquid water aliquot over a substantial portion of the reaction period, the liquid water aliquot being added in an amount of from 2 to 50 percent by weight of the carbonate, and adding additional liquid water to replace at least a portion of that removed as vapor during the carbonation reaction, the total amount of liquid water present in the reaction mixture being:

(i) sufficient to insure substantially uniform contact between the liquid water and the solid particles, but not so much as to agglomerate and cake the particles, and (ii) sufficient to moderate the rate of heat release by the carbonation reaction to maintain the temperature of the particulate reactant as aforesaid;

(b) mixing the particulate mass to effect intimate contact of the carbonate material, the liquid water and the carbon dioxide;

(c) maintaining the carbon dioxide at a partial pressure of from 0.2 to 0.9 atmosphere when the total pressure is 1 atmosphere, and at proportionately higher partial pressures at greater total pressures;

(d) evaporating liquid water adjacent the particulate reactant to cool the reacting particles; and (e) removing the water vapor-containing atmosphere to continue the evaporation of water to cool the reacting particles and maintain them within the aforesaid temperature range.

2. The process of claim 1, wherein the liquid water added in step (a) is in the form of water or a dilute aqueous solution of a water-soluble alkali metal or ammonium carbonate, hydroxide or bicarbonate.

3. The process of claim 1, wherein the reaction is carried out under a total pressure of one atmosphere, the partial pressure of carbon dioxide being from 0.4 to 0.7 atmosphere and the balance of the gaseous mixture in the reaction zone being water vapor and any inert gases present.

4. The process as defined in claim 3, wherein the temperature of the particulate carbonate reactant is maintained within the range of from 160° to 240° F., and the carbonation reaction is carried out for a period of from 30 to 40 minutes.

5. The process of claim 1, wherein substantially all of the carbonate groups of the water-soluble carbonate material reactant are converted to bicarbonate.

6. The process of claim 1 in which the water vapor removed in step (e) is condensed, and at least a portion of the condensate, or an additional quantity of liquid water equivalent to the amount of water vapor removed, is the additional liquid water added in step (a).

7. The process of claim 1, wherein the carbon dioxide is added throughout the entire reaction period and the liquid water is added during all but a final portion of the reaction period.

8. The process of claim 1, wherein the water-soluble carbonate material reacted is selected from the group consisting of anhydrous sodium carbonate, potassium carbonate, ammonium carbonate, and calcined trona.

9. In a process for carbonating anhydrous sodium carbonate to sodium bicarbonate, the improvement comprising reacting the anhydrous sodium carbonate in solid, particulate form with liquid water in a carbon dioxide-containing atmosphere under a total pressure of from 1 to 3 atmospheres to form a solution of sodium carbonate within each individual particle, to convert at least 15% by weight of the anhydrous sodium carbonate to sodium bicarbonate, and to crystallize the sodium bicarbonate, and carrying out the reaction by contacting the anhydrous sodium carbonate, the liquid water and the gaseous carbon dioxide for from 20 to 45 minutes, the longer the reaction time, the higher degree of conversion, while maintaining the temperature of the particulate reactant within the range of from 125° to 240° F., by:

(a) adding both relatively dry carbon dioxide gas and a liquid water aliquot over a substantial portion of the reaction period, the liquid water aliquot being added in an amount of from 2 to 50 percent by weight of the carbonate, and adding additional liquid water to replace at least a portion of that removed as vapor during the carbonation reaction, the total amount of liquid water present in the reaction mixture being:
(i) sufficient to insure substantially uniform contact between the liquid water and the solid particles, but not so much as to agglomerate and cake the particles, and
(ii) sufficient to moderate the rate of heat release by the carbonation reaction to maintain the temperature of the particulate reactant as aforesaid;

(b) mixing the particulate mass to effect intimate contact of the anhydrous sodium carbonate, the liquid water and the carbon dioxide;

(c) maintaining the carbon dioxide at a partial pressure of from 0.2 to 0.9 atmosphere when the total pressure is 1 atmosphere, and at proportionately higher partial pressures at greater total pressures;

(d) evaporating liquid water adjacent the particulate reactant to cool the reacting particles; and (e) removing the water vapor-containing atmosphere to continue the evaporation of water to cool the reacting particles and maintain them within the aforesaid temperature range.

10. The process as defined in claim 9, wherein all the carbonate groups of the anhydrous sodium carbonate reactant are converted to sodium bicarbonate.

11. The process as defined in claim 9, wherein the liquid water aliquot added in step (a) is added in an amount of from 8.5 to 30% by weight of the anhydrous sodium carbonate and the carbonation is carried out at a temperature and for a period sufficient to convert from 15 to 80% of the anhydrous sodium carbonate to sodium bicarbonate.

12. The process of claim 9 in which the water vapor removed in step (e) is condensed, and at least a portion of the condensate, or an additional quantity of liquid water equivalent to the amount of water vapor removed, is the additional liquid water added in step (a).

13. In a process for carbonating a water-soluble, hydrated alkali metal or ammonium carbonate material in the solid phase to convert at least 15% by weight of the carbonate values present to the corresponding bicarbonate, the improvement comprising reacting the carbonate material in solid, particulate form with liquid water in a carbon dioxide-containing atmosphere under a total pressure of from 1 to 10 atmospheres to form a solution of the carbonate reactant within each individual particle and to crystallize the bicarbonate product formed therein, and carrying out the reaction by contacting the solid carbonate material, the liquid water and the gaseous carbon dioxide for from 5 to 60 minutes, the longer the time, the higher the degree of conversion, while maintaining the temperature of the particulate reactant within the range of from 125° to 240° F., by:

(a) adding both relatively dry carbon dioxide gas and a liquid water aliquot over a substantial portion of the reaction period, the liquid water aliquot being added in an amount of from 2 to 50 percent by weight of the carbonate, and adding additional liquid water to replace at least a portion of that removed as vapor during the carbonation reaction, the total amount of liquid water present in the reaction mixture being:
(i) sufficient to insure substantially uniform contact between the liquid water and the solid particles, but not so much as to agglomerate and cake the particles, and
(ii) sufficient to moderate the rate of heat release by the carbonation reaction to maintain the temperature of the particulate reactant as aforesaid;

(b) mixing the particulate mass to effect intimate contact of the carbonate material, the liquid water and the carbon dioxide;

(c) maintaining the carbon dioxide at a partial pressure of from 0.2 to 0.9 atmosphere when the total pressure is 1 atmosphere, and at proportionately higher partial pressures at greater total pressures;

(d) evaporating liquid water adjacent the particulate reactant to cool the reacting particles; and (e) removing the water vapor-containing atmosphere to continue the evaporation of water to cool the reacting particles and maintain them within the aforesaid temperature range.

14. The process of claim 13, in which the water vapor removed in step (e) is condensed, and at least a portion of the condensate, or an additional quantity of liquid water equivalent to the amount of water vapor removed, is the additional liquid water added in step (a).

15. The process of claim 13, wherein the water-soluble carbonate material reacted is selected from the group consisting of sodium carbonate monohydrate and sodium sesquicarbonate, and wherein the liquid water aliquot added in step (a) is added in an amount of from 7% to 30% by weight of the sodium carbonate monohydrate or in an amount of from 2% to 4% by weight of the sodium sesquicarbonate, respectively.

16. The process of claim 13 wherein the liquid water added in step (a) is in the form of water or a dilute aqueous solution of a water-soluble alkali metal or ammonium carbonate, hydroxide or bicarbonate.

17. The process of claim 13, wherein the carbon dioxide is added throughout the entire reaction period and the liquid water is added during all but a final portion of the reaction period.

18. The process of claim 13, wherein the reaction is carried out under a total pressure of one atmosphere, the partial pressure of carbon dioxide being from 0.4 to 0.7 atmosphere and the balance of the gaseous mixture in the reaction zone being water vapor and any inert gases present.

19. The process as defined in claim 13, wherein the temperature of the particulate carbonate reactant is maintained within the range of from 160° to 240° F., and the carbonation reaction is carried out for a period of from 30 to 40 minutes.

20. The process of claim 13, wherein substantially all of the carbonate groups of the water-soluble, hydrated carbonate material reactant are converted to bicarbonate.

* * * * *